(12) United States Patent
Summey et al.

(10) Patent No.: US 11,869,727 B2
(45) Date of Patent: Jan. 9, 2024

(54) DEVICE AND PROCESS FOR FORMING MEMBRANE TYPE CAPACITOR DEVICES

(71) Applicant: KEMET Electronics Corporation, Fort Lauderdale, FL (US)

(72) Inventors: Brandon Summey, Simpsonville, SC (US); Jeffrey Poltorak, Simpsonville, SC (US); Robert Andrew Ramsbottom, Simpsonville, SC (US); Kevin A. Agosto, Simpsonville, SC (US)

(73) Assignee: KEMET Electronics Corporation, Ft. Lauderdale, FL (US)

( * ) Notice: Subject to any disclaimer, the term of this patent is extended or adjusted under 35 U.S.C. 154(b) by 0 days.

(21) Appl. No.: 17/462,459

(22) Filed: Aug. 31, 2021

(65) Prior Publication Data
US 2023/0065146 A1 Mar. 2, 2023

(51) Int. Cl.
| H01G 9/08 | (2006.01) |
| H01G 9/042 | (2006.01) |
| H01G 9/26 | (2006.01) |
| H01G 9/15 | (2006.01) |

(52) U.S. Cl.
CPC ............. H01G 9/08 (2013.01); H01G 9/042 (2013.01); H01G 9/26 (2013.01); H01G 9/15 (2013.01)

(58) Field of Classification Search
CPC .......................................... H01G 9/08
See application file for complete search history.

(56) References Cited

U.S. PATENT DOCUMENTS

| 4,454,529 | A | * | 6/1984 | Philofsky | ............. H05K 9/0039 257/665 |
| 4,831,490 | A | * | 5/1989 | Voeten | ................... H01G 4/228 361/523 |
| 6,185,091 | B1 | | 2/2001 | Tanahashi et al. | |
| 6,819,546 | B2 | | 11/2004 | Kuriyama | |
| 7,161,797 | B2 | | 1/2007 | Vaisman et al. | |
| 7,595,235 | B2 | | 9/2009 | Arai et al. | |
| 10,079,113 | B2 | | 9/2018 | Summey et al. | |
| 2004/0017645 | A1 | * | 1/2004 | Arai | ...................... H01G 9/042 361/302 |
| 2010/0165547 | A1 | | 7/2010 | Kuranuki et al. | |
| 2019/0006116 | A1 | * | 1/2019 | Petrzilek | .................. H01G 9/15 |

FOREIGN PATENT DOCUMENTS

JP 2001358032 A * 12/2001

OTHER PUBLICATIONS

"What is a polymer composite", Quora website, (Year: 2017).*

* cited by examiner

Primary Examiner — Eric W Thomas
(74) Attorney, Agent, or Firm — Joseph T. Guy; Patent Filing Specialist Inc.

(57) ABSTRACT

An improved capacitor, and method of making the capacitor, is described. The capacitor comprises an upper reinforced encapsulant layer and a lower reinforced encapsulant layer with a capacitive element between the upper reinforced encapsulant layer and lower reinforced encapsulant layer. The capacitive element comprises an anode, a dielectric on the anode and a cathode on the dielectric. An internal reinforced encapsulant layer is between the upper reinforced encapsulant layer and lower reinforced encapsulant layer.

56 Claims, 12 Drawing Sheets

DEVICE AND PROCESS FOR FORMING MEMBRANE TYPE CAPACITOR DEVICES

FIELD OF THE INVENTION

The present invention is related to capacitors and methods for manufacturing electronic components, specifically capacitors and preferably valve metal capacitors, which provides an improvement in volumetric efficiency while maintain or improving electrical performance. Even more specifically, the present invention provides an improved capacitor, and method of forming an improved capacitor with improved volumetric efficiency obtained through the use of membrane and resin system, for example prepreg, that form an encapsulant with a controllable thickness between the capacitive elements and the external capacitor surface.

BACKGROUND

It is standard practice in the manufacture of valve metal capacitors, particularly surface mount valve metal capacitors, to form a monolithic structure comprising an anode lead extending from an anode. A dielectric and charge collecting cathode is on the surface of the anode with the dielectric between the anode and cathode. The anode will typically have a roughened or increased surface area, on which the dielectric and cathodes are formed, so as to increase the capacitance of the device. The manufacturing process includes forming an anode lead, which extends from the anode, to a lead frame at a first location and attaching the cathode to a lead frame at a second location.

It is necessary for the anodic components and the cathodic components to be sufficiently separated to avoid electrical arcing as would be readily understood. This requirement creates a loss in volumetric efficiency since a significant volume of the ultimate capacitor device does not contribute to capacitance. For example, with reference to FIG. 1A, the volume of the capacitor which surrounds the anode lead, 3, extending from the anode face from which the anode lead extends to the outer edge of the encapsulant, 8, provides no electrical purpose and only functions to provide a location for attachment of the lead frame, 4, to the anode lead with sufficient separation from the cathode layers to avoid damage during welding. This problem is exacerbated by the necessity to provide enough separation between the active area of the capacitive element and the weld, 9, in order to ensure that the effects of the weld operation, radiating unabated through the environment towards the sensitive and unprotected dielectric and cathodic layers, do not degrade the quality and performance of those layers. Shielding of the element from the weld process does not prove beneficial in reducing the occupied volume because practical limits of manufacturing precision prevent shortening of the distance required beyond that required without shielding. When multiple capacitive elements are combined into one capacitor the volumetric efficiency is even further eroded.

Electronic device manufacturers, who are the primary purchasers of surface mount capacitors, have a large installed manufacturing infrastructure tailored to mounting a surface mount capacitor onto a circuit board, or related element, to form an electrical sub assembly. Therefore, it is a necessity to provide capacitors which are structurally similar to surface mount capacitors as currently employed. Particularly the size, shape, and dimensions of the device must be consistent with the installed base for use in existing attachment locations and attachment systems. The electronics industry is also constantly seeking to miniaturize electronic devices, or extract greater capacity and capability from the same size devices. This forces the manufacturer of components, such as capacitors, to seek more functionality in a given volume. These contradictory requirements have led to the desire for a surface mount capacitor which has a higher volumetric efficiency, or capacitance per unit volume, while mimicking an industry standard surface mount capacitor in size and lead orientation. To address the loss in volumetric efficiency due to the anode attachment to its respective leadframe, some manufacturers have attempted to locate the attachment outside of the encapsulant. Some methods of connecting an anode extension to a preexisting external terminal, external to an encapsulant, have been proposed in U.S. Pat. Nos. 6,819,546 and 7,161,797 both of which are incorporated herein by reference. These methods involve forming a portion of the traditional lead frame material with the anode and cathode adhered to the leadframe, or equivalent, embedded in the encapsulant, and connecting the edge of the terminal to the exposed anode extension with a conductive layer applied onto the end of the device.

Other methods of construction are provided in U.S. Publ. Appl. No. 2010/0165547 which is incorporated herein by reference. Described therein is a device wherein the anode extension, and a portion of the applied conductive cathode, is exposed outside of the protective encapsulant. The end surfaces of the device from which the anode extension(s) and cathode layer are exposed are then flame sprayed, and subsequently made solderable, to create a terminal on each end of the device. This applied terminal material exists only on the end faces of the device, and does not have a significant presence on the bottom, or mounting surface, of the device. The terminals also cover the entire end faces of the device. This design represents a valve metal device with the terminal structure of a multi-layered ceramic capacitor (MLCC) device. These terminal configurations are undesirable in the art, as these devices are not interchangeable with the industry standard termination specifications for surface mount capacitors. Furthermore, these terminal configurations are undesirable because the terminals extend the full width of the device. It is common in the industry for the mounting pad on the printed circuit board to be narrower than the device terminal as this provides a stabilizing effect on the device during the soldering process when mounting the device to a printed circuit board (PCB). When the terminal extends the full width of the device the mounting pad on the printed circuit board is wider than the device effectively requiring more space on the circuit board than can ever be filled by the capacitive device with this terminal configuration resulting in less than ideal volumetric efficiency. Thus, a device that has terminals that are significantly narrower than the width of the device requires mounting pads on the printed circuit board that are narrower than the capacitive device, and thus require less space on the PCB, resulting in greater volumetric efficiency of the PCB. It is preferred that a device would conform to the industry standard and preferably the device terminal would be 0.4 mm, or more, narrower than the device case. Terminal configurations in which the terminal reaches the top surface of the device, as those disclosed in U.S. Pat. Nos. 6,819,546 and 7,161,797, and U.S. Publ. Appl. No. 2010/0165547 are also undesirable due to a common condition of modern electronic devices exhibiting RF transmission, or those sensitive to external RF and EM interference, as in cellular telephones where conductive metal grounded shielding is placed over the circuit board to mitigate such problems. In these devices, the shielding can come into contact with the top of the devices mounted to the PCB. Therefore, devices with terminals reaching the top of the device provide a potential electrical path between the terminals and the grounded shield thereby rendering the device and the circuit inoperable.

Other methods of constructing surface mount solid electrolytic capacitors have been proposed such as those described in U.S. Pat. No. 6,185,091 which is incorporated herein by reference. These teachings still lead to volumetric inefficiencies. The focus is a construction with performance improvement related to its impact on an electrical circuit. The design requires the attachment of anode and cathode extensions. These teachings describe terminals that are mechanically attached prior to encapsulation. As described above, this occupies space inside the encapsulation that lowers the volumetric efficiency of the device. In addition, no methods of attachment are taught and must be assumed to follow conventional methods of attachment that have no advantage in volumetric efficiency.

In addition to the volumetric efficiency advantage gained from the method of attachment of the anode and cathodes, the encapsulation method plays a large role in the device's final volumetric efficiency. Many ways are used in the art to produce a thin wall of encapsulant on the active element to protect the active element from the environment. Traditional methods include injection molding around the element such that the element is suspended within the injection molding cavity. This method fails in improving efficiency as features that are part of the process of suspending the elements in the cavities must be substantial enough to support the elements, and thus are incorporated within the device occupying space not used for active capacitance. An example of this space occupying material is the leadframe. The leadframe must extend inside the package to support the element and its ability to support the element is related to its thickness. Additionally, methods known as facedown use one side of the leadframe, opposite of the capacitive element, to be supported against the molding cavity, thus reducing its required thickness for supporting the element. However, decreasing the thickness of the facedown leadframe is limited by its ability to be adhesively bound to the encapsulant and by the thickness required to mechanically lock the leadframe with the encapsulant. If either of these aspects are lacking, due to trying to improve the volumetric efficiency, then the external forces on the capacitor terminals are transferred directly to the internal elements with potential of damage occurring. These factors limit the volumetric efficiency improvements, specifically around the thickness dimension of the device. Additionally, the leadframe configuration within the facedown design does not address the difficulty in controlling the encapsulant thickness on the side of the element opposite the facedown leadframe. This thickness is still controlled by the injection molding processes ability to flow laterally between the surface of the capacitor and the surface of the cavity die.

The injection molding process is a process by which resin is brought into a cavity within which the capacitive elements have been suspended. This suspension is typically done by supporting portions of the traditional terminations of the leadframe or such, as in facedown packaging, by the compression of the leadframe down to a surface and the injection cavity located opposite of that surface. One issue with this process is that the resin is then presented to the cavity either directly within the capacitor cavity at the site of a long aspect ratio region or outboard of this capacitor cavity where resin does not enter at the site of a long aspect ratio region. If the resin is presented within a portion of the capacitor cavity the portion of the resin, which is in contact with the cavity portion of the device, must later be removed so as to not be part of the finished device. This removal process can both impact the electrical performance or the final target dimension capability and is made further difficult as the resin wall thickness is reduced in miniaturization. In addition, steps taken to remove this portion can add cost and complexity, especially when trying to control the final dimensions, as an ongoing goal in the art. If the injected resin is presented outbound of the cavity, then the major constraint to the process is the resin's ability to be flowed into long aspect ratio cavities. As is the goal in miniaturization, the resin wall between the capacitive element and external environment is preferably made as small as possible. In this case of standard capacitors in the industry it is possible to have regions of the cavity in which resin must flow 100 times or more in length versus the thickness of the wall attempting to be injected too. This long aspect ratio makes it difficult to fill due to back pressure created from the flow and its effects on the other flow characteristics in the remaining portion of the cavity, thereby risking more mixing of the resin adjacent to the heated cavity die possibly causing the material to cure prematurely.

It is possible to achieve process conditions, and materials, that allow for the long aspect ratio fills between the cavity and the elements, however, as stated this typically results in a high pressure being required to transfer the material across these long portions of the capacitive element and may add to the cost and complexity of the materials used. This high pressure can also create a series of unwanted characteristics. If the long aspect ratio exists on two sides of the capacitive elements the practicality of having evenly balanced pressures is poor and thus the capacitive elements may be biased to one side of the encapsulant. This bias takes away from the overall thickness potential of the final component as the final component will typically require a minimum encapsulant wall thickness. Further difficulties in processing parts with such a long aspect filling ratio is that the pressure created during the time the material is filling through the long aspect portion can result in stress being applied to the element risking damage to the element or forcing it to move within the package, resulting in poor quality and/or poor efficiency.

Another method of achieving good fill over longer aspect ratios is pre-filling the cavity with a liquid resin and lowering the cavity to a fixed height and forcing the liquid resin out of the cavity, leaving only the desired amount of resin defined by the lowering of the cavity and other fixed portions with the cavity. The limitation with this method is that when trying to achieve very thin walls of encapsulant the manufacturing variation of each capacitive element will limit the achievable wall thickness due to maintaining the minimum wall thickness for every part requires that the cavity thickness for the encapsulant be fixed for the largest of the variation within the capacitive elements. To process each element with varying height control is impractical and leaving some finished components with too thin of a encapsulant wall could have failures later in the process.

Other methods disclosed include the use of resin sheets to provide resin directly to the portions of the encapsulant so that the resin does not have to traverse the long aspect ratio portions of the device as described in U.S. Pat. No. 7,595,235 which is incorporated herein by reference. This process is helpful in reducing the effects of the encapsulant resin movement due to the resin being distributed over the capacitive element surface prior to flowing the resin into place. This method helps in reducing this stress at the encapsulation process but still lacks finer control of the encapsulant thickness without a method to control the final cavity dimensions that form the thickness of the capacitor.

A more recent method is described in commonly assigned U.S. Pat. No. 10,079,113 which is incorporated herein by reference. In this teaching membranes are used within the encapsulant wherein the resin is incorporated in the membrane. Though beneficial, the capacitive element moves during the process and therefore additional space is required between capacitive elements which is undesirable. Furthermore, adequate coverage of the capacitive element in the resin is difficult to provide reproducibly.

As set forth above, there is an ongoing desire for a device with improved volumetric efficiency while maintaining the exact terminal configuration consistent with industry standards for valve metal surface mount capacitors. In spite of the extensive efforts there is still a desire for increased volumetric efficiency and improvements in the electrical performance of capacitors. Such improvements are provided herein.

SUMMARY OF THE INVENTION

The present invention provides an improved capacitor and method of manufacturing an improved capacitor.

A particular feature of the invention is the presentation of a device with a construction, and method of constructing, wherein the volume occupied by the encapsulant is significantly reduced thereby increasing the volumetric efficiency without detriment to the function of the capacitor.

Yet another embodiment is provided in a capacitor. The capacitor comprises an upper reinforced encapsulant layer and a lower reinforced encapsulant layer with a capacitive element between the upper reinforced encapsulant layer and lower reinforced encapsulant layer. The capacitive element comprises an anode, a dielectric on the anode and a cathode on the dielectric. An internal reinforced encapsulant layer is between the upper reinforced encapsulant layer and lower reinforced encapsulant layer.

Yet another embodiment is provided in a method for forming a capacitor comprising:
forming a capacitive element comprising an anode, a dielectric on the anode and a cathode on the dielectric;
providing an upper prepreg, a lower prepreg and an inner prepreg wherein the inner prepreg comprises a pocket;
forming a layered structure of the upper prepreg and lower prepreg with the inner prepreg between the upper prepreg and lower prepreg and with the capacitive element in the pocket; and compressing the layered structure and curing at least the resin to form the capacitor.

Yet another embodiment is provided in a method for forming a capacitor comprising:
forming a capacitive element comprising an anode, a dielectric on the anode and a cathode on the dielectric;
forming a layered structure with the capacitive element and at least one overloaded prepreg comprising a membrane and a resin; and compressing the layered structure and curing at least the resin to form the capacitor.

Yet another embodiment is provided in an electronic component comprising an upper reinforced encapsulant layer, a lower reinforced encapsulant layer, and an electronic element between the upper reinforced encapsulant layer and lower reinforced encapsulant layer. An internal reinforced encapsulant layer is between the upper reinforced encapsulant layer and lower reinforced encapsulant layer.

DESCRIPTION

The present invention provides an electronic component, and particularly a capacitor, with improved volumetric efficiency and a method for manufacturing the electronic component. The method includes an improved method for controlling the encapsulant wall between the electronic element of the electronic component and external surface of the encapsulant through the use of a prepreg. The prepreg may comprise excess resin and/or be formed into pockets. In an embodiment the pockets may be stabilized with additional prepreg which is planar or serpentine.

The invention will be described with reference to the various figures forming an integral, but non-limiting, component of the specification. Throughout the various figures similar elements will be numbered accordingly.

Figure 1A:
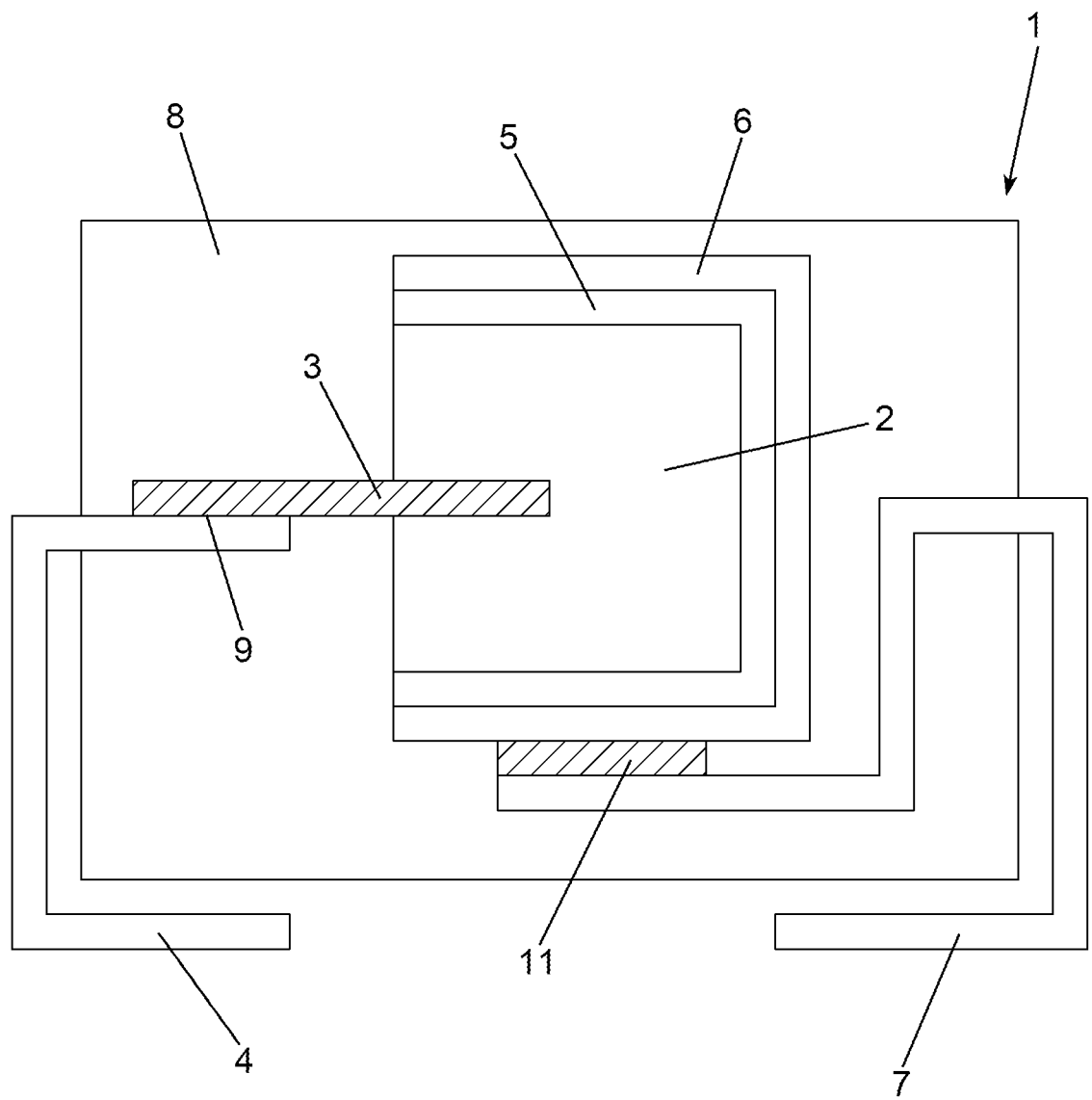
FIG. 1a schematically illustrates a prior art surface mount capacitor.

FIG. 1A schematically illustrates a prior art surface mount capacitor, 1, in cross-sectional view. In FIG. 1A, the anode, 2, has an anode lead, 3, extending therefrom. The anode lead is electrically connected to an anode leadframe, 4, typically by welding, 9. A dielectric, 5, on at least a portion of the anode separates the anode from a cathode, 6. The cathode is electrically connected to a cathode leadframe, 7, by conductive adhesive, 11, and the entire structure, except for the contact portions of the anode leadframe and cathode leadframe, is encased in a non-conducting encapsulant, 8. The anode leadframe, 4, and cathode leadframe, 7, preferably originate as a portion of a near-continuous lead frame in the form of an array, as is well documented in the art, with multiple anode leads and cathode leads integral to a common lead frame. The anode and cathode leads are electrically disconnected when capacitors are singulated such as by dicing.

Figure 1B:
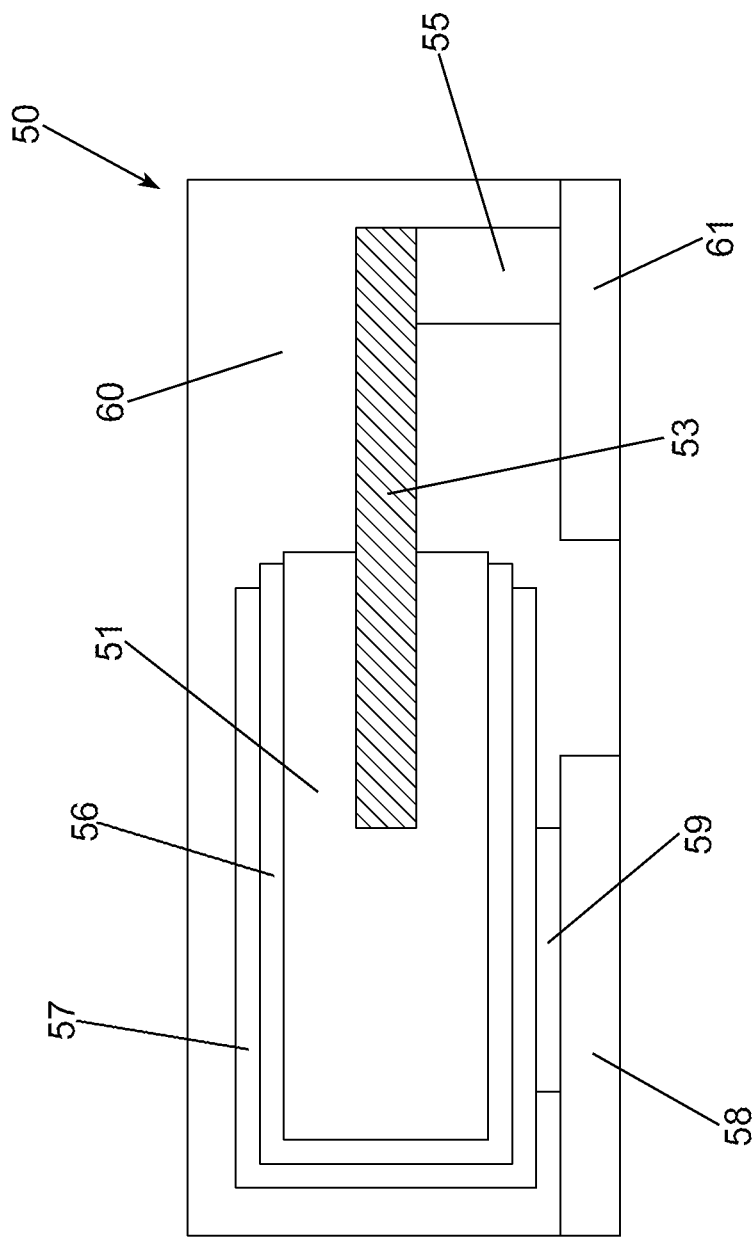
FIG. 1b schematically illustrates a prior art facedown surface mount capacitor.

FIG. 1B schematically illustrates a prior art facedown surface mount capacitor, 50, in cross-sectional view. In FIG. 1B, the anode, 51, has an anode lead, 53, extending therefrom. The anode lead is electrically connected to an anode leadframe tab, 55, typically by welding. A dielectric, 56, on at least a portion of the anode separates the anode from a cathode, 57. The cathode is electrically connected to a cathode leadframe, 58, by conductive adhesive, 59, and the entire structure, except for the contact portions of the anode leadframe and cathode leadframe, is encased in a non-conducting encasement, 60. The anode leadframe, 61, and cathode leadframe, 58, preferably originate as a portion of a near-continuous lead frame in the form of an array, as is well documented in the art, with multiple anode leads and cathode leads integral to a common lead frame. The anode and cathode leads are electrically disconnected when capacitors are singulated such as by dicing.

Figure 1C:
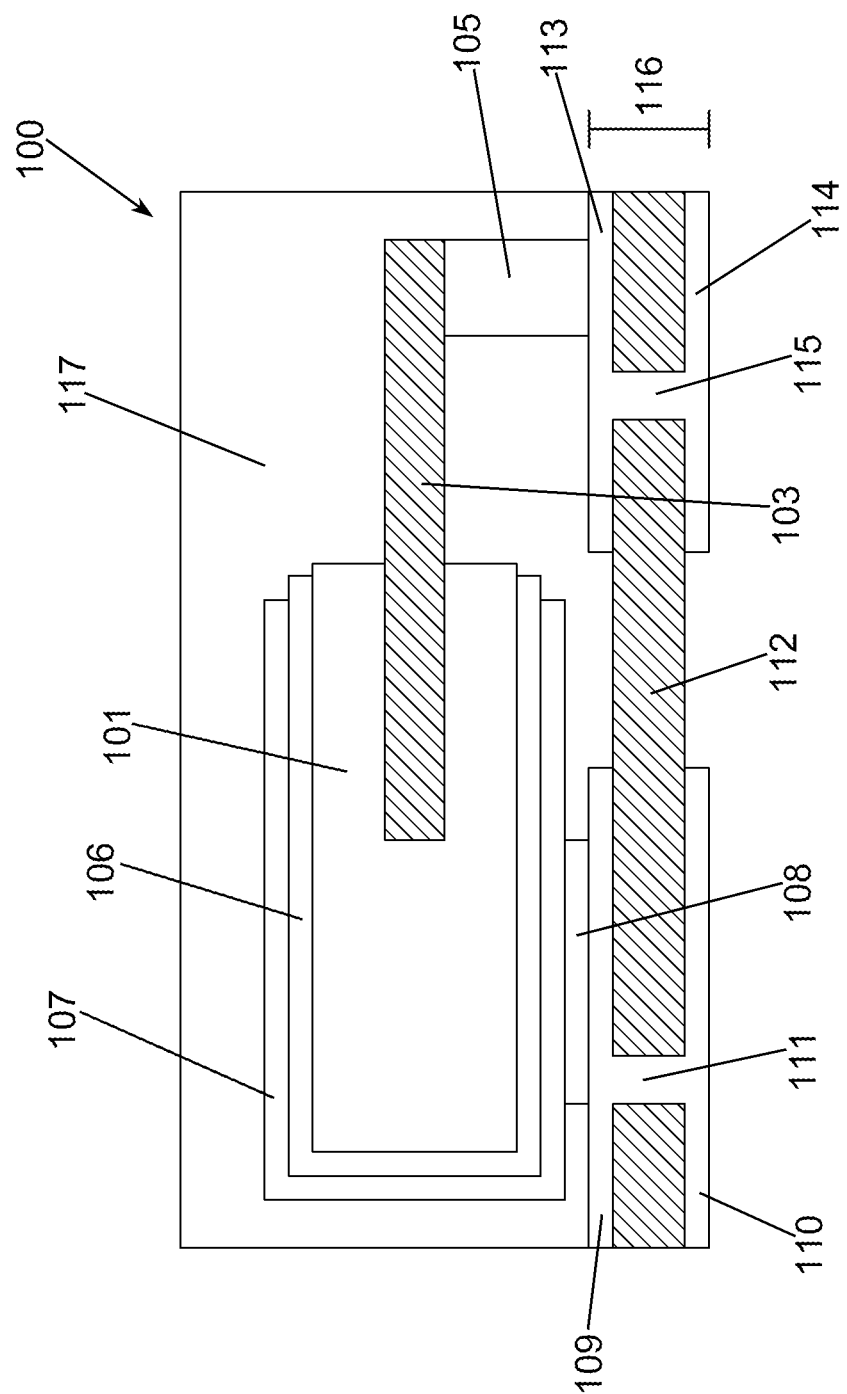
FIG. 1c schematically illustrates a prior art substrate structure surface mount capacitor.

FIG. 1C schematically illustrates, in cross-sectional view, a prior art surface mount capacitor, 100, on a substrate, 116. In FIG. 1C, the anode, 101, has an anode lead 103, extending therefrom. The anode lead is electrically connected to an anode spacer, 105, typically by welding. A dielectric, 106, on at least a portion of the anode separates the anode from a cathode, 107. The cathode is electrically connected to an internal cathode pad, 109, by conductive adhesive, 108. The internal cathode pad is electrically connected to the external cathode terminal, 110, by the cathode electrical path, 111, typically formed by plating a hole in the substrate, 112. The internal anode pad, 113, is electrically connected to the external anode terminal, 114, by the anode electrical path, 115, typically formed by plating a hole in the substrate, 112. The anode spacer, 105, is electrically connected to the anode lead, 103, and electrically connected to the internal anode pad, 113, typically by welding or soldering. The entire structure, except for substrate assembly, 116, that comprises the internal anode and cathode pads, external anode and cathode terminals, anode and cathode electrical paths, and substrate is encapsulated in non-conducting encapsulant, 117. At least portions of the internal anode and cathode pads, and a portion of the substrate, are in contact with the non-conducting material to form a device with portions of the external anode and cathode terminals exposed on the bottom surface of the device.

Figure 1D:
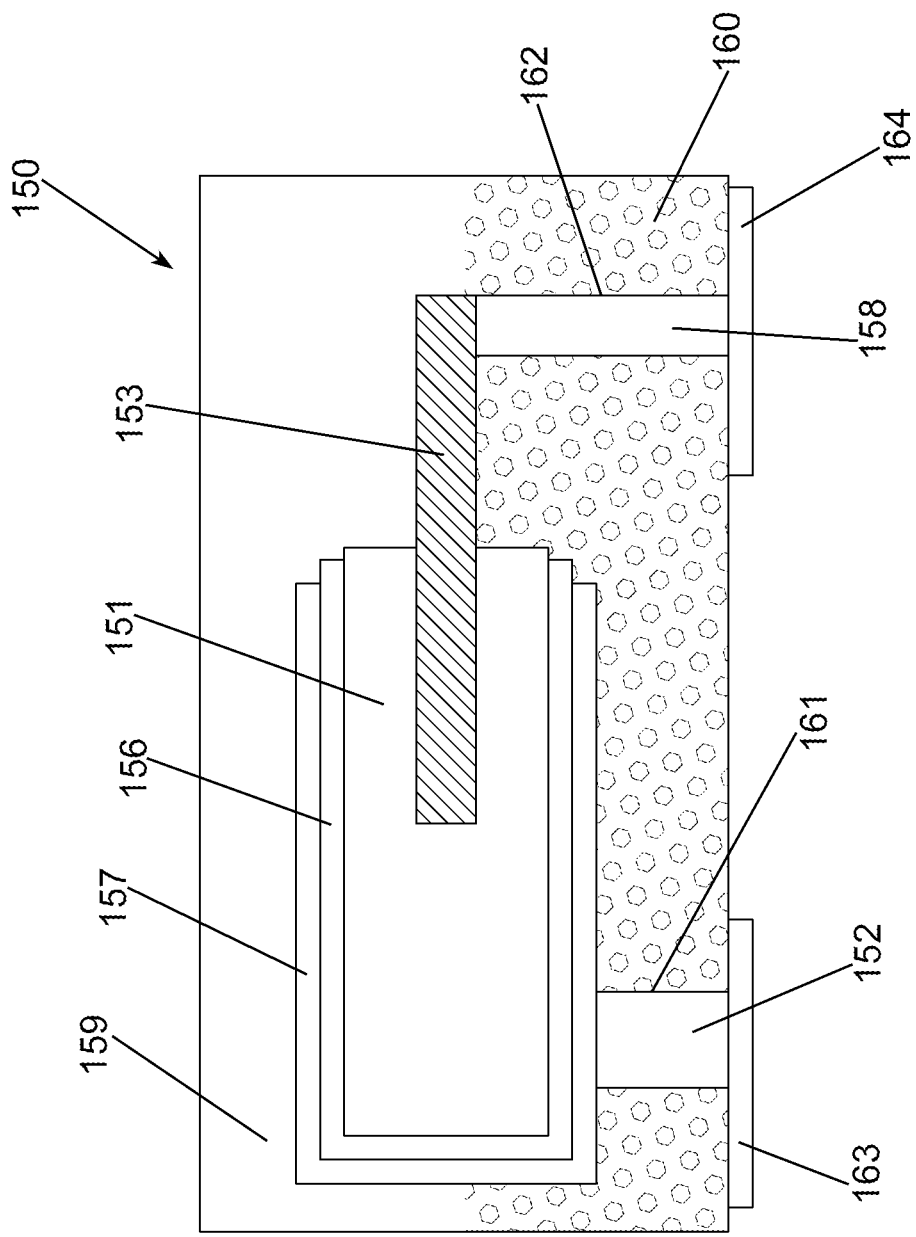
FIG. 1d schematically illustrates a prior art resin sheet structure surface mount capacitor.

FIG. 1D schematically illustrates a prior art resin sheet structure surface mount capacitor, 150, in cross-sectional view. In FIG. 1D, the anode, 151, has an anode lead, 153, extending therefrom. A dielectric, 156, on at least a portion of the anode separates the anode from a cathode, 157. The capacitive element comprises the anode, anode lead, dielectric and cathode. The capacitive element is encapsulated with a non-conductive adhesive, comprised of two resin layers, a top resin layer, 159, and a bottom resin layer, 160. Hole, 161 is formed in the bottom resin layer, 160, to the cathode, 157, and metalized to form an electrical connection, 152, between the cathode, 157, and external cathode terminal, 163. Hole, 162, is formed to the anode lead, 153, and metalized to form an electrical connection, 158, between the anode lead, 153, and the external anode terminal, 164.

The prior art assemblies illustrate the typical construction methods of solid electrolytic valve metal capacitors which utilize a leadframe or plated terminations to terminate the device. The inventive devices are intended to be a direct replacement for the prior art and therefore preferably match the terminal configurations of the prior art while improving the volumetric efficiency. Furthermore, the inventive devices are suitable for use with a broader array of electronic elements thereby providing a broader selection of electronic components with improved volumetric efficiency.

Figure 2:
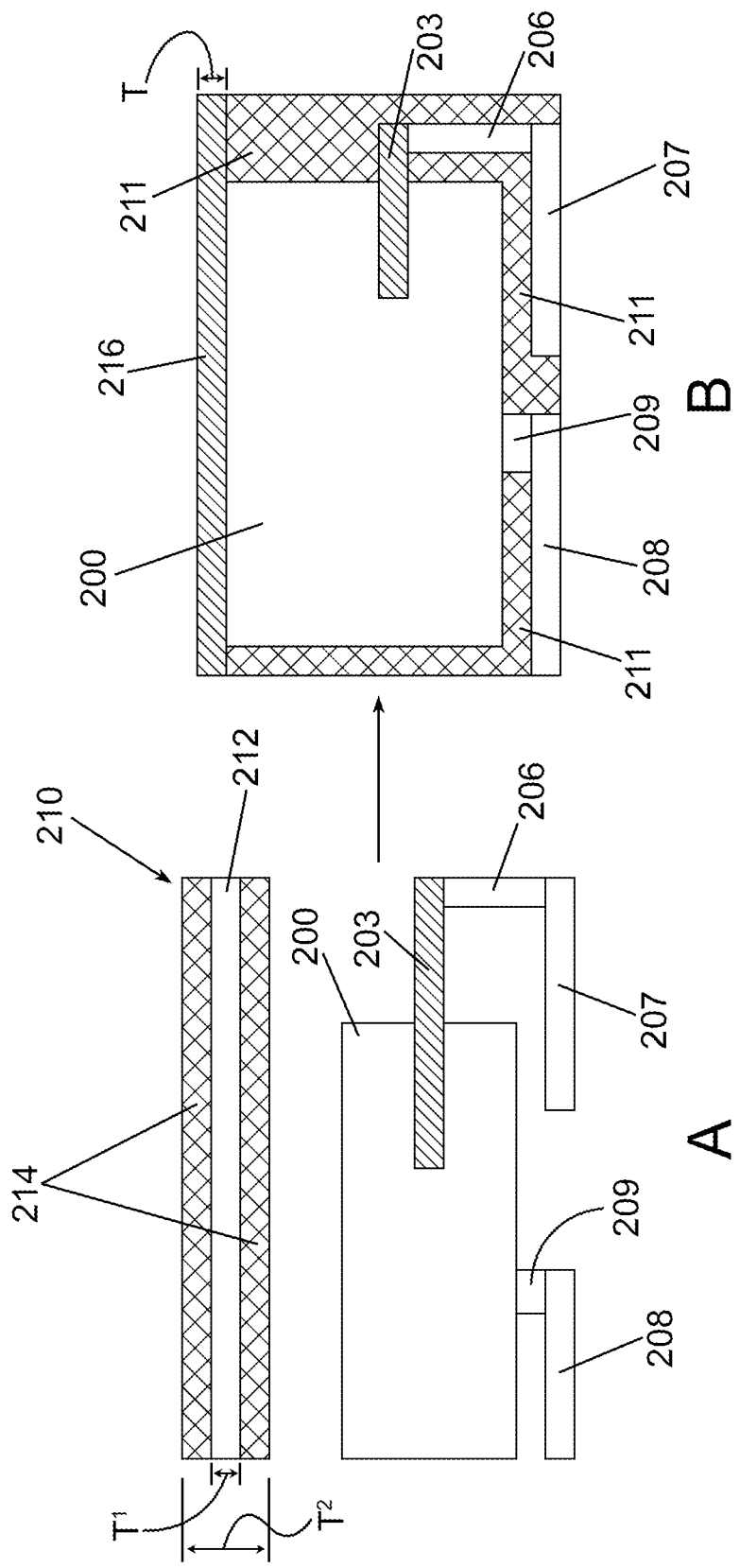
FIG. 2 is a cross-sectional schematic representation of an embodiment of the present invention.

FIG. 2 schematically illustrates an embodiment of the present invention wherein the steps of forming an electronic component with an electronic element are demonstrated by the formation of a capacitor from a capacitive element as the electronic element without limit thereto. The steps are illustrated in partially exploded view in A and after completion in B. In FIG. 2, a capacitive element, 200, representing the electronic element, is illustrated wherein the capacitive element comprises an anode, preferably a valve metal anode, with an anode lead, 203, represented as an anode wire, extending therefrom. A dielectric is on at least a portion of the anode wherein the dielectric separates the anode from a cathode. The anode, dielectric and cathode are well known and not illustrated separately. The anode lead, 203, is connected to anode leadframe tab, 206, typically by welding. The anode leadframe tab, 206, is connected to, or integral to, the anode leadframe, 207. The cathode is the outer coating of the capacitive element, 200, and is electrically connected to the cathode leadframe, 208, typically with conductive adhesive, 209. An overloaded prepreg, 210, comprising a membrane, 212, with a resin, 214, integral thereto and incorporated therein is eventually pressed and cured to form a reinforced encapsulant, 216, as will be more specifically discussed herein. By utilizing an overloaded prepreg the amount of resin available to encapsulate the capacitive element can be sufficient to form a resin encapsulation, 211, after processing, wherein the resin present in the membrane layer and membrane form the reinforced encapsulant, 216, and resin encapsulation layer, 211, combine to form the encapsulation.

In FIG. 2, the electronic element is a capacitive element, resistive element, varistor element, inductive element, diode, fuse, overvoltage discharge element, sensor, switch, electrostatic discharge suppressor, semiconductor or integrated circuit with a capacitor being preferred. The electronic element comprises leads with the functionality between the leads. The electronic element is represented as a cathode with the functionality between the leads being a capacitive couple. One of skill in the art would realize that other elements would have a different functionality between the leads and would therefore be easily substituted for a capacitive element throughout the description and figures.

A prepreg is a composite material comprising a membrane which is pre-impregnated with a resin. The membrane may be an ordered membrane such as a woven membrane or a random membrane such as a non-woven membrane. The membrane preferably comprises fibers which are ordered or random. The fibers are typically made of glass, though the fibers may be made from other materials such as carbon fibers, cellulose, or similar, including fibers that may be the same material as the resin with the preference for fibers which are at least partially cured. The resin is preferably a thermoplastic resin or a thermoset resin which is preferably not cured or only partially cured. The prepreg is typically formed as a layer, compressed and then cured wherein the resin and, if appropriate, the membrane are preferably completely cured. A conventional prepreg has enough resin to impregnate the entire membrane such that upon compression the resin is expressed from the membrane prior to being cured.

An overloaded prepreg, for the purposes of this invention, is a prepreg comprising an excess of resin wherein the volume of resin, prior to compression or curing is larger than the volume of membrane region, including resin incorporated into the membrane. After formation of the capacitor the volume occupied by the membrane is essentially the same as the membrane volume in a normal prepreg which is essentially the volume of the membrane or which may be sightly compressed. The excess resin of the overloaded prepreg impregnates the membrane and forms a resin encapsulation, 211, occupying at least a portion of the area around the capacitive element and associated connective components and preferably the entire portion of the area around the capacitive element and associated connective components. The resin also impregnates the membrane after completion thereby forming a reinforced encapsulant, 216. After compression and curing the reinforced encapsulant, 216, has a thickness, T, which is no more than the thickness of the membrane $T^2$ in the overloaded prepreg. The excess resin of the overloaded prepreg forms at least a portion of the resin encapsulation, 211.

In a particularly preferred embodiment, the overloaded prepreg comprises a sufficient amount of resin to represent a thickness, $T^2$, which is at least 110% of the thickness of the membrane, $T^1$, prior to compression and curing. Therefore, the excess volume of resin will be allowed to impregnate the membrane and fill area around the capacitive element, representing an electronic element, and associated connective components. More preferably the resin represents at least 125% of the thickness of the membrane prior to complete curing. Even more preferably the resin represents at least 150% of the thickness of the membrane prior to complete curing. During preparation of the electronic component the overloaded prepreg is compressed and cured.

Figure 3:
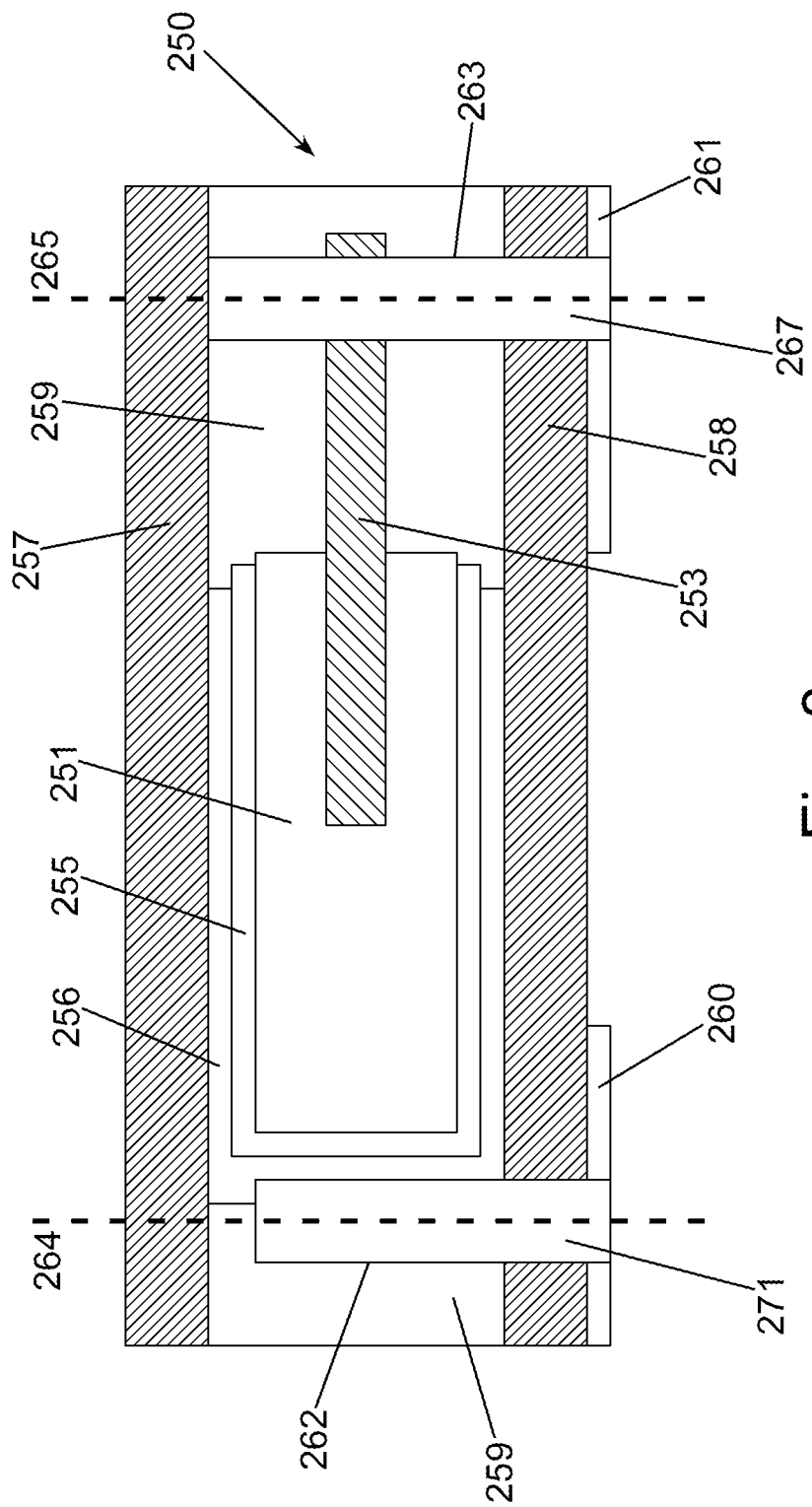
FIG. 3 is a cross-sectional schematic representation of an intermediate step of an embodiment of the invention.

FIG. 3 schematically illustrates an embodiment of the invention wherein the electronic component, represented as capacitor, 250, is represented at an intermediate step of the manufacturing process. In FIG. 3, the anode, 251, which is preferably a valve metal anode, has an anode lead, 253, extending therefrom. A dielectric, 255, on at least a portion of the anode separates the anode from a cathode, 256. A top reinforced encapsulant, 257, and a bottom reinforced encapsulant, 258, are positioned on opposite sides of the capacitive element in a sandwiched relationship. The top reinforced encapsulant, and bottom reinforced encapsulant, are preferably formed from overloaded prepreg. These reinforced encapsulants sandwich the capacitive element, representing the electronic element, which is also partially encased within the resin encapsulation, 259. At least a portion of the resin in the resin encapsulation is from the excess resin in the overloaded prepreg. The top reinforced encapsulant, 257, and bottom reinforced encapsulant, 258, work in concert with the resin encapsulation, 259, to at least partially encapsulate the capacitive element comprising the anode, anode lead, dielectric and cathode and form a pocket, or cavity, within which the encapsulant is contained during molding. Terminations, represented as external anode and cathode terminals, 260 and 261, are adhered to the bottom reinforced encapsulant, 258. An anode hole, 263, and cathode hole, 262, are formed within the external anode and cathode terminals, respectively, and through the bottom reinforced encapsulant, and resin encapsulation. The anode hole, 263, is formed in, and preferably through, the anode lead, 253, represented as an anode wire, and preferably to the top reinforced encapsulant. A metallization, 267, is formed in the anode hole such that the anode lead is electrically connected to the external anode terminal, and adhered to the resin encapsulation, 259. This metallization electrically connects the anode lead along the perpendicular cut portion of the anode lead so as to maximize the electrical connection area, without extending the hole size in the anode lead length direction. In an alternative embodiment the anode hole could reach the metal of the anode wherein the metallization of the anode hole directly electrically connects the anode and provides electrical connectivity to the external anode terminal. The metallization may be a single metal, an alloy, or a sequential series of metals to achieve adequate electrical conductivity. In this alternative embodiment the anode lead may or may not be present, and preferably the anode lead is not present so as to further improve the volumetric efficiency. The cathode hole, 262, is formed through a portion of the cathode, 256. This portion may be formed from the cathode layers of the capacitor element or material attached to the cathode layers to form a preferable material for electrical connection. The cathode hole, 262, is metalized to form an electrical connection between the cathode and external cathode terminal. Lines, 264 and 265, represent a preferred embodiment of the present invention, wherein the line represents the portion of the device that is cut so as to form a device with a defined length. The cutting process, typically dicing, preferable exposes a portion of the metalized holes, 262 and 263, thereby forming an end termination for the capacitor after cutting as will be realized from FIG. 4.

Figure 4:
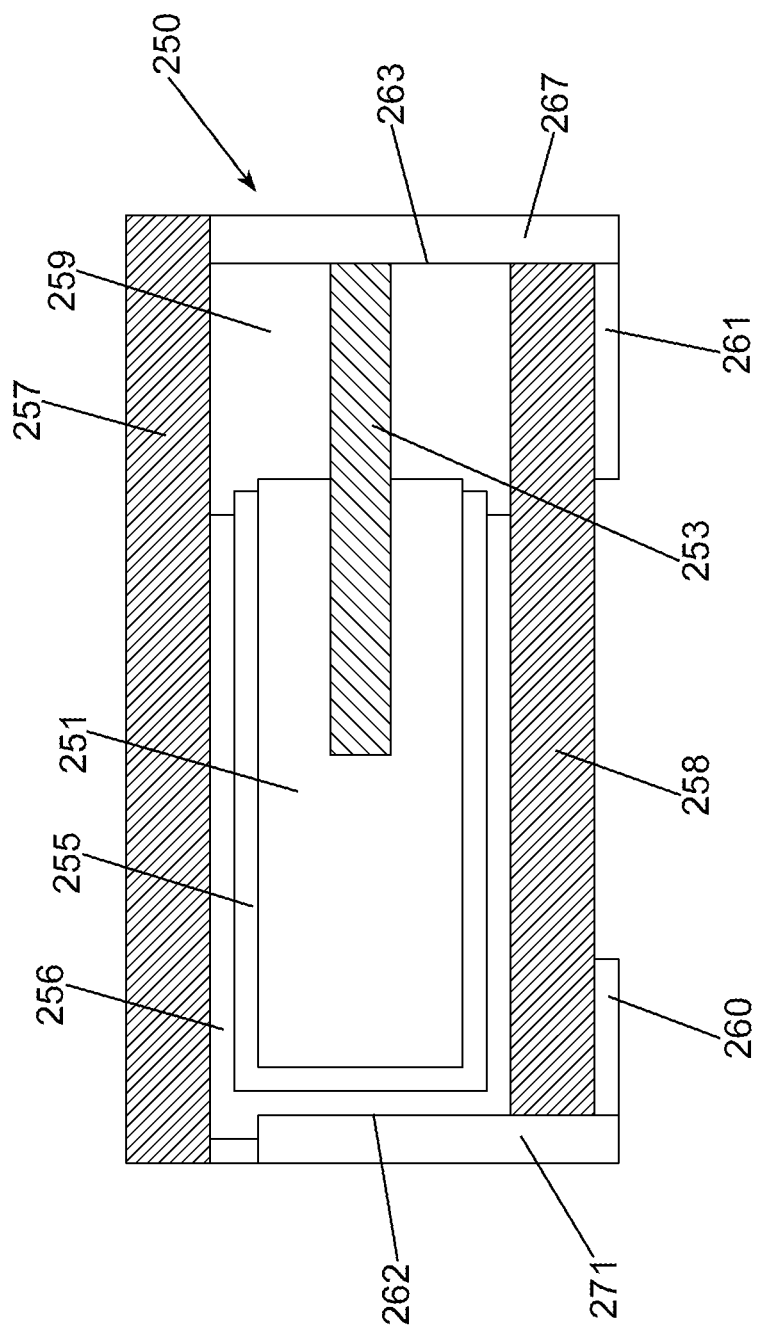
FIG. 4 is a cross-sectional schematic representation of an embodiment of the present invention.

FIG. 4 schematically illustrates the embodiment of FIG. 3 after cutting. In FIG. 4, the electronic component is represented as a capacitor, 250, having an anode, 251, preferably a valve metal anode, with an anode lead, 253, represented as an anode wire, extending therefrom. A dielectric, 255, on at least a portion of the anode separates the anode from a cathode, 256. A top reinforced encapsulant, 257, and bottom reinforced encapsulant, 258, are positioned on opposite sides of the capacitive element in sandwiched relationship. These reinforced encapsulants position the capacitive element within the resin encapsulation, 259, where top reinforced encapsulant, 257, bottom reinforced encapsulant, 258, and resin encapsulation, 259, function in concert to at least partially encapsulate the capacitive element. It is preferred, but not limited thereto, that the top reinforced encapsulant, 257, bottom reinforced encapsulant, 258, and resin encapsulation, 259, comprise a common resin and the resin may permeate one or both membranes. The resin may further comprise more than one resin system, such as a mix of a plurality of resins or the use of copolymers. It is also further preferable in one embodiment, but not limited thereto, that a resin forming the lower reinforced encapsulant, 258, emanates from the membrane layer and fills in around the capacitive element between the membranes. External anode and cathode terminals, 261 and 260, are adhered to the resin encapsulation, 259. The remaining portions of the anode hole, 263, and cathode hole, 262, and metallization contained therein form conductive leads on a face of the capacitor and may function as a circuit trace to connect to additional functionality integral to, or on, the encapsulant.

Figure 5:
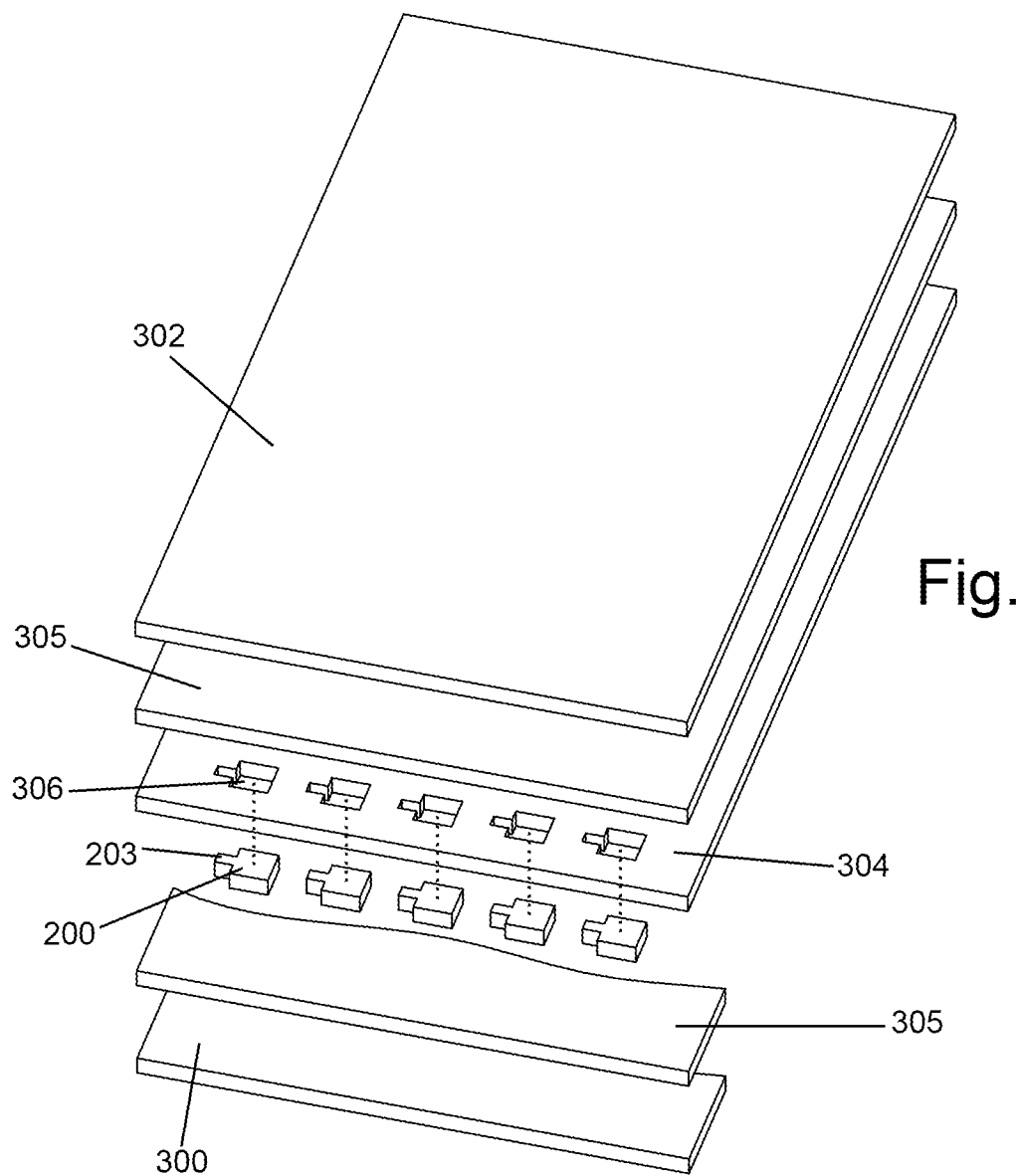
FIG. 5 is a schematic exploded representation of an embodiment of the present invention.

An embodiment of the invention will be described with reference to FIG. 5. In FIG. 5 an exploded view of a layered assembly is illustrated. The layer assembly comprises a lower prepreg, 300, and upper prepreg, 302, which may be of the same composition. At least one of the lower prepreg or upper prepreg may be an overloaded prepreg. A pocketed layer, 304, comprises pockets, 306, which are suitable for accepting a electronic element, 200, and termination represented as a wire, 203, therein. The pocketed layer can be a resin layer, which is preferably partially cured, or a prepreg comprising a membrane and resin. The pocketed layer may be an overloaded prepreg. Optional auxiliary resin layers, 305, which do not comprise a membrane, can be provided between the lower prepreg and pocketed layer or between the upper prepreg and pocketed layer to provide additional resin if the upper or lower prepreg do not have sufficient resin to fully fill the voids around the electronic element. It is preferred that the pocketed layer be no thicker than the thickness of the capacitive element and more preferably the pocketed layer is thinner than the thickness of the capacitive element. The layered assembly is compressed and at least the resin is cured resulting in a structure which will be more fully described with reference to FIG. 6. Preferably, the pocket does not electrically contribute to the electrical functionality of the electronic element.

Figure 6:
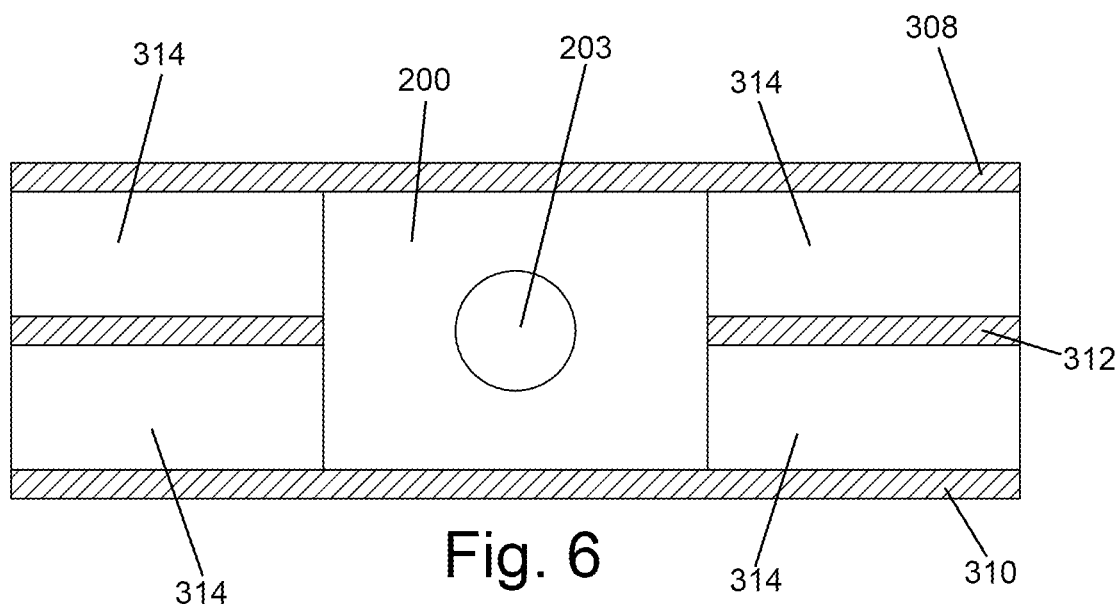
FIG. 6 is a cross-sectional schematic representation of an embodiment of the present invention.

FIG. 6 is a cross-sectional view of a cured embodiment taken perpendicular to the anode wire, 203, extending from the electronic element represented by a capacitive element, 200. The upper prepreg is compressed and cured to form reinforced encapsulant layer, 308, and the lower prepreg is compressed and cured to form reinforced encapsulant layer, 310. If the pocketed layer is a prepreg or overloaded prepreg an optional but preferred internal reinforced encapsulant layer, 312, is formed parallel to the outer reinforced encapsulant layers, 308 and 310. While is it preferred that the internal reinforced encapsulant layer be substantially parallel, manufacturing limitations prevent such ideal parallelism. It should understood that the internal reinforced encapsulant layer may have undulations that are present due to irregular flow of resins. A resin encapsulation, 314, encapsulates the capacitive element and anode wire. The resin encapsulation may be formed from resin of the upper prepreg, lower prepreg or auxiliary resin layer.

Figure 7:
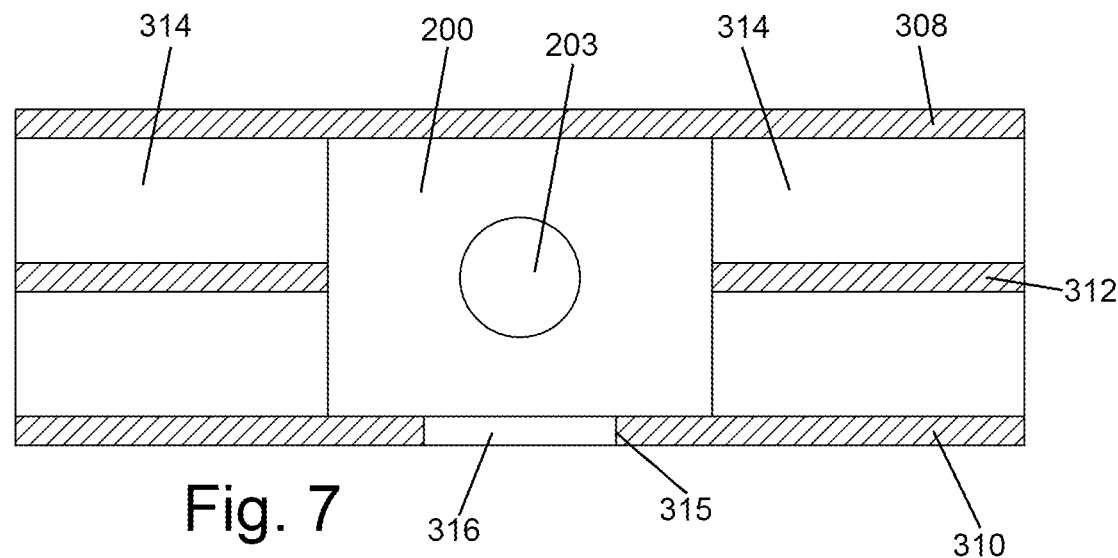
FIG. 7 is a cross-sectional schematic representation of an embodiment of the present invention.

An embodiment of the invention is illustrated in FIG. 7 wherein a cured embodiment is illustrated in cross-sectional view. In FIG. 7 a void, 315, in the membrane of the prepreg or overloaded prepreg provides a resin filled gap, 316, which can be used to form a via for electrical connectivity to the anode or cathode of the capacitive element. It is preferred but not limited thereto, that the void be created in the prepreg before encapsulation. It is understood that the resin will generally fill the void in the prepreg after lamination. Due to the void being created prior to the encapsulation the membrane will not be present in the void region.

Figure 8:
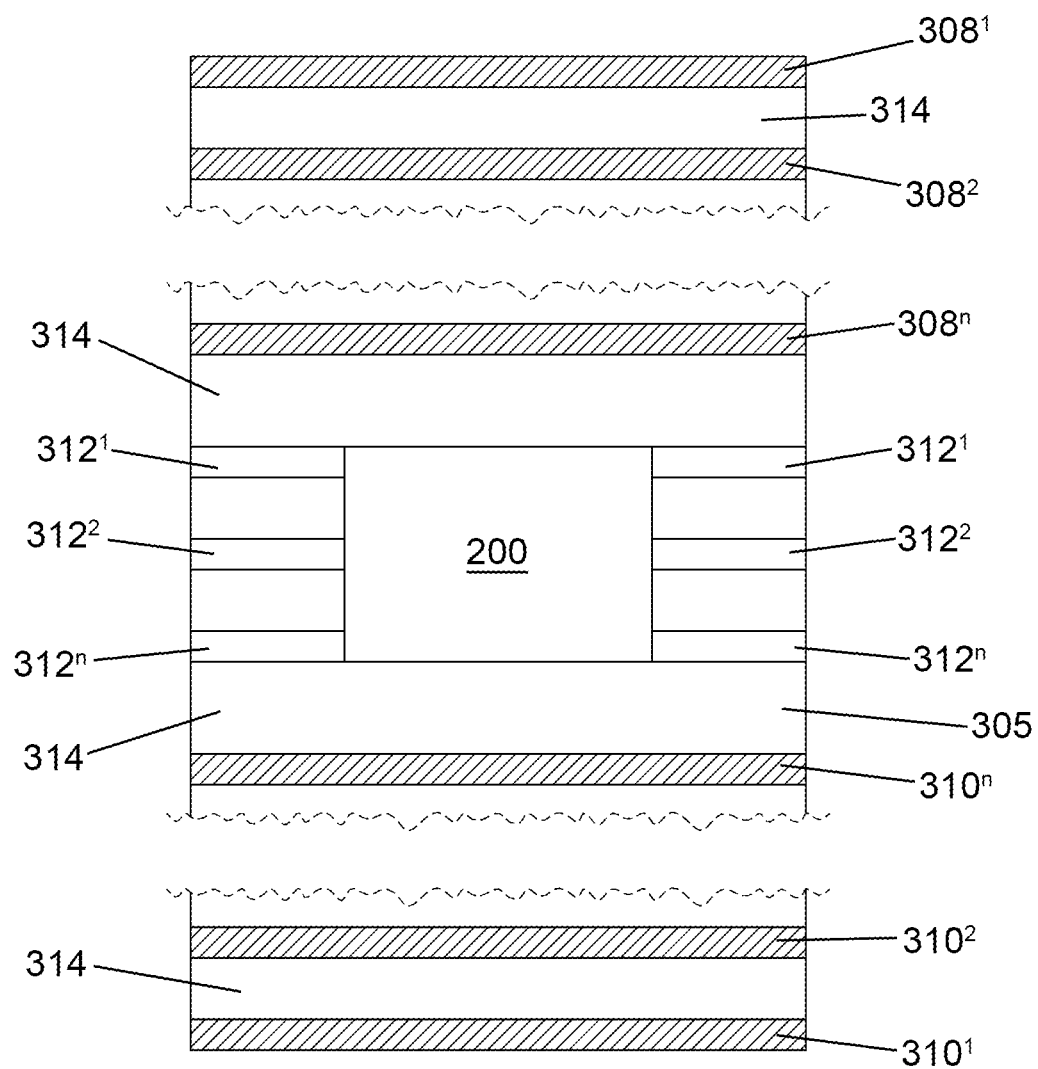
FIG. 8 is a cross-sectional schematic representation of an embodiment of the present invention.

An embodiment of the invention is illustrated in FIG. 8 wherein multiple reinforced encapsulant layers, 308 and 310, and multiple internal reinforced encapsulant layers, 312, are formed around the electronic element represented as a capacitive element, 200. Optional auxiliary resin layers, 305, can provide additional resin if the resin provided with the prepreg is insufficient to fill the area.

Figure 9:
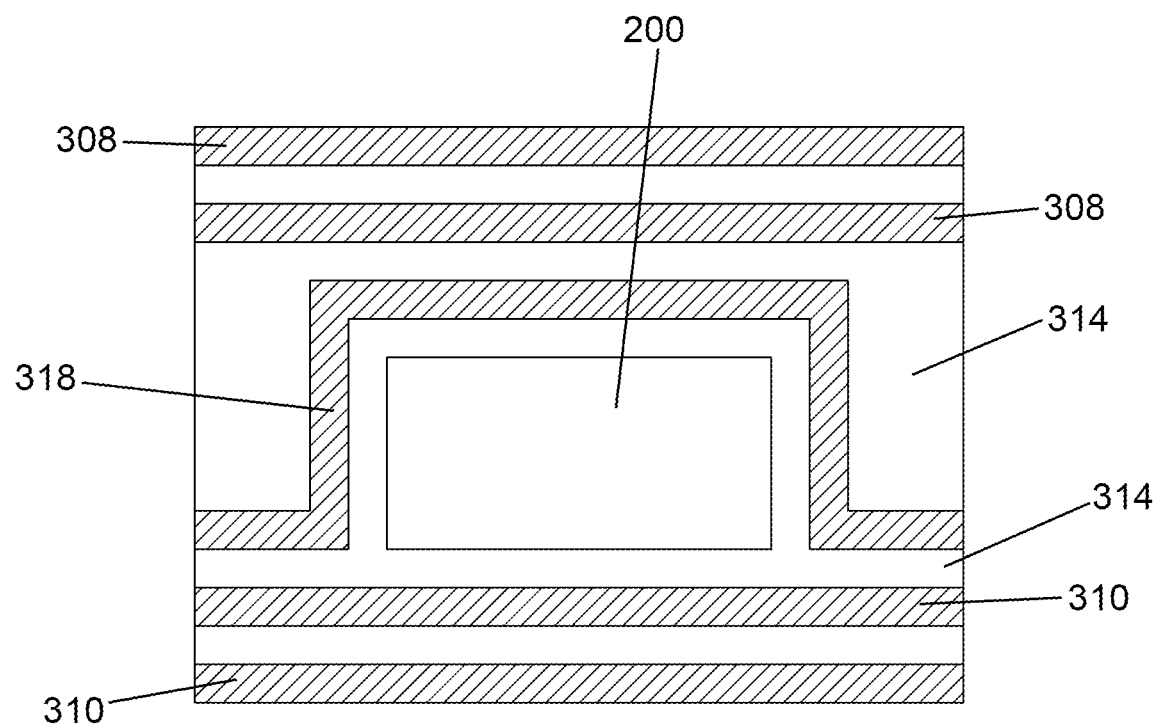
FIG. 9 is a cross-sectional schematic representation of an embodiment of the present invention.

An embodiment of the invention will be described with reference to FIG. 9 wherein an electronic component, represented as a capacitor, is illustrated in cross-sectional schematic view. In FIG. 9, at least one reinforced encapsulant layer, 308 and 310, is on each side of the body of the electronic element wherein the reinforced encapsulant layers are approximately planar. An inner serpentine reinforced resin encapsulant, 318, at least partially extends around the electronic element, 200, thereby forming a reinforced encapsulant pocket within which the electronic element resides. The inner serpentine reinforced encapsulant layer can be formed from a prepreg, comprising a resin and a membrane, or an overloaded prepreg as described herein. The serpentine reinforced resin encapsulant can be formed by overlaying a previously placed capacitive element or sacrificial shape which is later removed. Alternatively, a pocket may be formed of a serpentine prepreg or overloaded prepreg wherein the electronic element is placed in the pocket prior to compression and curing. The serpentine reinforced resin layer may also be formed from non-woven or non-continuous membrane material. Non-continuous fibers may be used to form the serpentine path that is substantially perpendicular to the reinforced encapsulant layers, 308 and 310. It is preferable that the reinforced resin encapsulant does not contribute to the electronic function but may provide other electrical or physical functions as further discussed herein. It may also be preferable that the resin encapsulant, 308 or 310, not be present such that 318 provides the space between the electronic element 200, and the external device surface.

Figure 10:
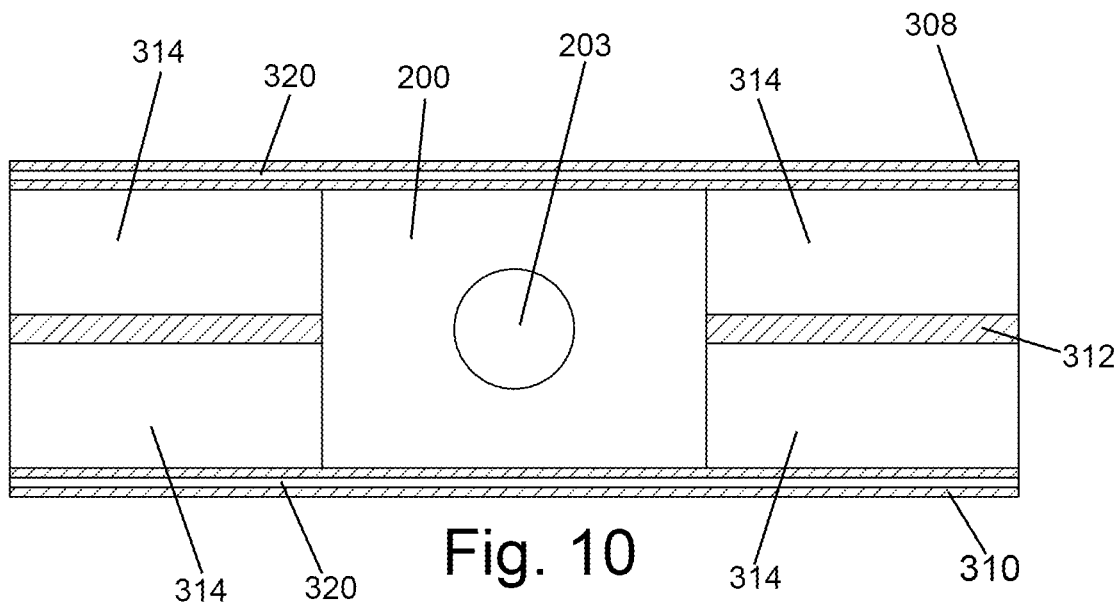
FIG. 10 is a cross-sectional schematic representation of an embodiment of the present invention.

FIG. 10 is a cross-sectional view of a cured embodiment of an electronic component represented as a capacitor. FIG. 10 is taken perpendicular to the anode wire, 203, extending from the capacitive element, 200. In FIG. 10 an optional internal metal layer, 320, is incorporated in at least one reinforced encapsulant layer, such as 308 and 310, thereby providing physical or electrical functionality to the reinforced encapsulant layer. The internal metal layer may provide physical properties to the capacitor such as electromagnetic interference shielding, thermal dissipation, reduced moisture permeation and other advantageous properties. The internal metal layer may be electrically isolated from the capacitive couple and terminations related thereto. In an alternate embodiment the internal metal layer may be functionalized, such as to provide resistance or to function as a fuse, in which case it may be electrically connected to an external terminations. In another embodiment the internal metal layer may be separately terminated to provide protection from surface ionization thereby inhibiting arcing or to provide thermal dissipation.

Figure 11:
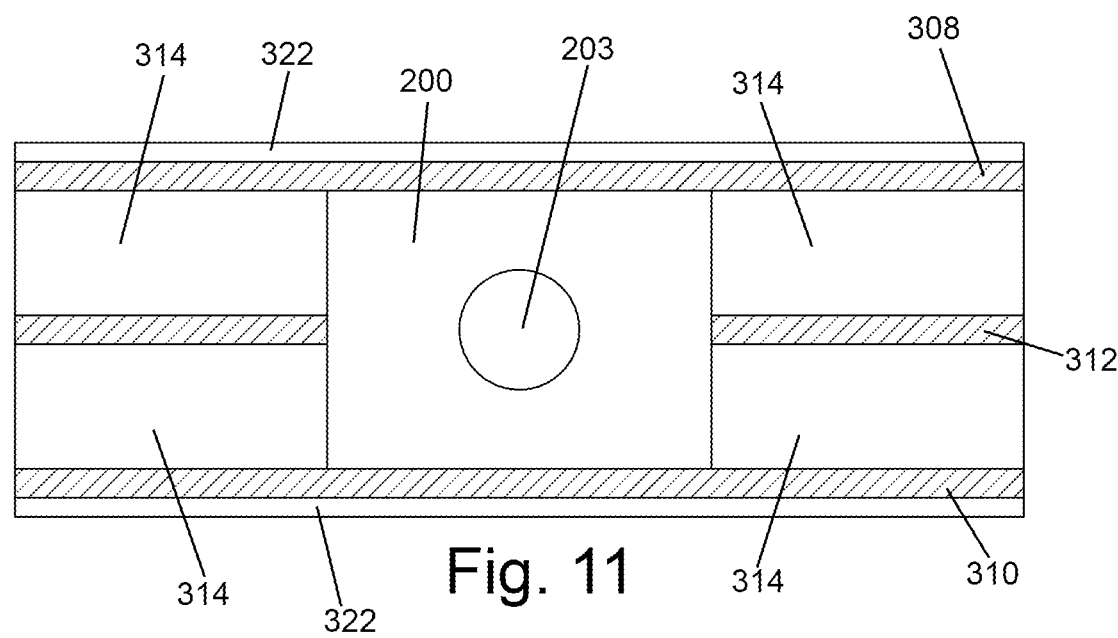
FIG. 11 is a cross-sectional schematic representation of an embodiment of the present invention.

FIG. 11 is a cross-sectional view of a cured embodiment taken perpendicular to the termination, represented as an anode wire, 203, extending from the electronic element represented as a capacitive element, 200. In FIG. 11 an optional surface metal layer, 322, is incorporated on at least one reinforced encapsulant layer, 308 and 310. The surface metal layer may provide physical properties to the electronic element such as electromagnetic interference shielding, thermal dissipation, reduced moisture permeation and other advantageous properties. The surface metal layer may be electrically isolated from the capacitive couple and terminations related thereto. In an alternate embodiment the surface metal layer may be functionalized, such as to provide resistance or to function as a fuse, in which case it may be electrically connected to an external terminations. In another embodiment the surface metal layer may be separately terminated to provide protection from surface ionization thereby inhibiting arcing. The surface metal layer may be integral to the prepreg or overloaded prepreg or provided by metallization such as in a plating process.

In a preferred embodiment a capacitor comprising at least one anode comprising a valve metal or conductive oxide of a valve metal, and an anode wire. A dielectric is formed on the anode and a cathode layer is formed on the dielectric. The capacitive element is attached to a leadframe, wherein the anode lead is electrically attached to the leadframe on an anode portion of the leadframe and the cathode of the capacitive element is attached to the cathode portion of the leadframe, typically by conductive adhesive. The prepreg is between the external capacitor device surface and the capacitive element on two, opposite sides of the device such that the membrane of the prepreg provides a fixed thickness of the encapsulant in the thickness dimension of the capacitor device.

In manufacturing the capacitor, the capacitive element and leadframe is presented into an encapsulant forming cavity with a pregreg disposed on at least one, and preferably opposing sides, of the capacitive element and leadframe such that the membranes of the prepreg resist the encapsulant forming cavity in the device's thickness direction.

The region of the mold cavity that forms a limitation for the encapsulation material to flow during encapsulation, is further referred to as encapsulant forming cavity. This cavity can form any side of the device by limiting the flow of the encapsulation material. As is with the membrane of the prepreg, this cavity can further serve as the portion of the encapsulation cavity that contacts with the membrane of the prepreg to define the external position of any of the outside surfaces of the device. This would be analogous to what is known as the mold cavity wall. A portion of a cavity wherein the device external surfaces are defined by this cavity's internal shape. While this relates to a traditional mold cavity, the encapsulation forming cavity may also be a single surface, such as a plate or series of connected surfaces, that define only a portion of the external surface of the device.

The present invention provides for a determinate, and repeatable, thickness of an encapsulated capacitor. By utilizing a prepreg, and bringing the prepreg to the surface of the capacitive element and mold cavity, the membrane of the prepreg effectively works in concert with a face of the capacitive element to form a cavity within which the encapsulant is constrained during molding while insuring the capacitive element is properly positioned within the encapsulant. In those directions where a membrane of the prepreg is not present the encapsulant may be restrained by the injection molding cavity. Exposure of the conductive components, either anode or cathode, allows for surface attachment of the termination onto the encapsulant, in electrical contact with the anode or cathode, thereby providing for a reduced thickness for the electrical connection. By use of the membrane of the prepreg a reduced thickness of encapsulant and a determinate and fixed thickness for the finished capacitor can be achieved. In such a device the membrane of the prepreg provides a portion of the device thickness yet the encapsulant is formed in the cavity and can be compressed onto, or into, the device with a predetermined thickness dimension being achieved during the encapsulation process.

In a preferred embodiment a prepreg, is provided between the cathode and external copper wherein the prepreg is in physical contact with the capacitive element. After compression and curing of either sandwiched arrangement a hole is formed through the copper and encapsulant such that it intersects the cathode of the capacitive element. Another hole is formed through the encapsulant layers and through the anode lead. The holes are preferably formed from the same side of the external copper. The hole is metalized by way of plating that adheres to the encapsulant and forms an electrical connection with the perpendicular surface of the anode lead and the external copper. A similar metalized hole forms an electrical connection between the cathode of the capacitive element and the external copper. The external copper is preferably etched in a pattern that electrically disconnects the anode and cathode portions on the surface of the device so as to form terminals. The copper is then treated in such a way as to present it as a solderable surface.

In one embodiment a capacitor is provided that comprises a metalized hole on at least the anode portion of the capacitor. The metalized hole is partially exposed through a cutting process thereby providing a solderable surface at each terminal connection region, that is on a different side of the capacitor than the terminal portion of the device. It is common in the industry for surface mount capacitors to have a metallized surface perpendicular on a side other than the terminal face facing towards the mounting surface to create a solder fillet surface where the solder used to attach the terminal to the circuit board can form up the side of the capacitor. This allows for visual verification of successful soldering and ease of rework of the device. Furthermore, the fillet of solder creates a balance of force on each end of the capacitor to keep the part centered in the desired circuit board space during the solder reflow process. The exposed portion of the metalized hole is retained with the device in such a manner that the entirety of connection between the metallization and the anode lead is intact. As with prior art descriptions, where in the hole is only formed to the anode lead, retaining the entirety of the connection to the anode lead while exposing the metalized connections on the side surfaces of the device is impractical. To expose any portion of the metalized hole, so as to improve the volumetric efficiency, would require removal of at least a portion of the anode lead connection with the metallized layer. Removing any portion of the metalized connection to the anode lead will result in a loss of electrical performance. Further, the use of forming holes that have the metallization formed within, makes manufacturing the capacitor with a perpendicular solderable surface to the terminal surface more effective. It is common for users of surface mount capacitors to desire a solderable surface up the perpendicular face of the device that is less than the width of this surface in any direction. In the present invention this aspect can be controlled by the depth and width dimensions of the hole formed to be metalized. Other methods in the art only allow for this metallization between the anode lead and the terminal to be formed over the entire perpendicular face of the device. This is undesirable to users for many factors, including likelihood of shorting the device and improper soldering of the device. It may be preferable in some situations to provide a connection surface over a plurality of surfaces of the capacitor, including the top and bottom portions simultaneously. It is the formation of the metalized hole and controlled removal of portions of the copper that provide for forming this metalization on any surface and in controlled forms, such as traces or patterns as required.

The membrane can be any layer that, with sufficient processing limits the thickness of the encapsulating resin wherein a portion of the encapsulating resin is bound during processing on at least two sides with one side the encapsulant forming cavity and the other side being a face of the capacitive element. The membrane thereby limits encroachment of an encapsulant forming cavity towards the capacitive element surface.

The encapsulant forming cavity is any surface which, when subjected to an encapsulation process, will act as a barrier to the encapsulant material and form a surface, which will become the external surface encasing at least a portion of the capacitive element when the device is removed from the cavity.

In one embodiment the membrane of the prepreg or overloaded prepreg is porous thereby allowing encapsulant material to penetrate through the membrane layer while the membrane layer may be in contact with the capacitive element surface on one face and the encapsulant forming cavity on the opposite face. The porous membrane could comprise a reinforcing material, or filler, such as glass weave, fibers, etched materials, or loose particles, that are all of controlled thickness.

In one embodiment the membrane comprises a solid film which may be impregnated with encapsulating resin or adhered to encapsulating resin.

In one embodiment the membrane is compressible. A compressible membrane can provide a fixed minimum distance between the capacitive element surface and the encapsulant forming cavity in compressed form and could be retained in compressed form by the encapsulant material or allowed to spring back. A compressible membrane provides a more uniform distribution of force across the capacitive element, or parallel capacitive elements within the same encapsulant forming cavity, such that the capacitive element is retained within a fixed distance from the encapsulant forming cavity while serving to reduce the force exerted on the capacitive element.

The membrane layer can be applied to a multitude of surfaces of the capacitive element so as to take advantage of the thickness limiting nature of the membrane for dimensions of the device other than the thickness.

In some embodiments an adhesive, or encapsulant material, can be between the capacitive element and membrane thereby adhering the membrane to the capacitor face. This resin or adhesive portion may secure the membrane to the capacitor face, and as such also becomes part of the thickness limiting function of the membrane.

It is typically not necessary that all surfaces of the membrane and the capacitive element be limited by the membrane of the prepreg providing the fixed thickness between the cavity and the capacitive element is achieved.

It is preferable that a hole formed for the creation of the anode connection be of sufficient depth and cross-sectional area as to provide an exposed anode lead by forming a hole through, preferably completely through, the anode lead instead of reaching the closest approach of the anode lead. Forming the hole through the anode lead exposes a cross sectional portion of the anode lead thereby increasing the electrical contact area of the metallization on the anode lead, without the increase in length along one direction of the anode lead thereby achieving improved volumetric efficiency of the device by achieving greater contact area without occupying significant length of the device. Another preferable advantage of forming the hole through anode lead is that the process allows for multiple anodes leads to be connected through the same hole thereby having common metallization for a group of capacitors. Providing multiple anodes, and thus anode leads in a common package is an advantage when additional capacitance or reduced resistance is required. It would also be preferable that the hole formed on the cathode portion of the device pass through the cathode to increase this connection, however, this is not required. The cathode layer typically traverses the majority of the length and width of the anode and thus has more surface area to contact during metallization without detriment to the volumetric efficiency.

The hole is formed by any technique known in the art and the metallization is accomplished by a method selected from plating, sputtering, deposition, sintering, diffusion, coating, and applying a conductive material, preferably a metal, in the hole.

The cathode layers are not limited herein and are consistent with those commonly found in the capacitor industry including cathode layers comprising conductive polymer, or manganese dioxide, on the dielectric of the anode. The conductive polymer layer can be formed by many methods known in the art such as, in situ polymerization, one pot polymerization, electrochemical polymerization, or prepolymerized polymer dips. Particularly preferred conductive polymers are polyanilines, polypyrroles, polythiophenes and derivatives thereof. A preferred polymer for demonstration of the invention is poly-3,4-ethylenedioxythiophene. Additional cathode layers are preferably formed on the conductive polymer layer or manganese dioxide layer to facilitate connecting thereto with carbon containing layers and metal containing layers being particularly suitable for demonstration of the invention. Carbon containing layers typically include conductive carbon in a resin. Metal containing layers typically include a metal filled resin layer, with resin containing silver flake being an example, or the metal containing layer may be a metal plating. It is preferable that the cathode layer be formed with metal plating as the process of metalizing the cathode layer within the cathode hole portion is simplified. A metal foil may be incorporated into the cathode. The metal foil may be attached to other cathode layers with various methods of electrical and physical attachment, including but not limited to, conductive adhesive, soldering, brazing, or welding. These cathode foils act as part of the cathode that delivers current to and from internal cathode layers. This cathode foil is preferably made of a metal such as but not limited to, copper, silver, stainless steel, or other conductive materials.

Terminals on the external surface of the device are employed to provide locations of electrical connection between the device and the electrical circuit. Terminals are typically made of a metal that is bondable by methods common in the industry. Such methods include, but are not limited to, soldering, wire bonding, brazing, welding, ultrasonic attachment, and copper pillar boding. The terminals are typically formed as a leadframe in some embodiments, by a metal foil in other embodiments, or a layer that is part of the device on the external surface of the device, such as made by plating. The most preferable metal for the terminals is copper due to its conductivity and other process advantages, but other metals or materials could serve as the terminal material or a portion of the terminal material, including but not limited to, nickel, stainless steel, metal filled polymers, conductive polymers, or similar. Terminals are typically square in shape to meet industry standards for placement on PCB soldering positions but this is not a limitation of the invention. The terminations may provide an electrical path between one or more portions of the external surface of the device and other external surface portions of the device. This would be commonly known in the industry as traces. Electrical paths formed on the surface of a device to connect a portion of the metallization that connects to the capacitive elements internal of the encapsulant, with other portions or surfaces of the encapsulant wherein terminals may be present. Providing these traces may simplify or provide electrical benefit by allowing the hole for metallization to be formed on or in one portion of the device while providing terminal(s) on other portions of the device, with or without the traces also being part of the connection portion of the terminal.

It is known to one skilled in the art that forming a sufficient metallization to a valve metal may require additional processing of the valve metal. In some cases, this is part of the metallization technique and is not apparent in the device as only the valve metal and metallization would be apparent. In some cases, the valve metal is difficult enough to metalize that it requires an additional step and material to prepare the valve metal. In such a case a portion of the anode, preferably but not limited to the anode lead, is treated in such a way so as to form a metallurgical bond to the valve metal with a material that is compatible with the hole metallization. This treatment may form an electrical bonding layer that promotes the electrical attachment performance of the metallization to the valve metal. It may also be preferable to attach a material, anode node, to the anode lead utilizing methods common in the industry, but not limited to, welding, brazing, soldering, bonding, sintering, etc. This anode node makes electrical contact with said anode lead in a manner that is beneficial by removing typical lead frame, while providing a material for the hole metallization to form a stable electrical connection.

The internal metal layer is understood by one skilled in the art not to be formed in a location or manner that it intersects with the metalization of the anode or cathode terminals, unless designed as part of the circuit. This prevents a short from occurring in the device, however, if the internal metal layer is formed in a way to as to work in concert with the anode or cathode terminations it may be preferable that one or more of the metalization layers intersect with the internal metal layer. Methods to achieve this include preshaping the internal metal layer before encapsulation, etching portions of the metal layer, or a similar process. The internal metal layer may cover only a portion of the surface area of the finished device as required by the construction and terminal designs. It is also contemplated that the internal metal layer is undulating or serpentine to cover additional surface area of the capacitor element. The metal layer may provide electrical or physical aspects of the final device. As such the internal metal layer may be exposed or electrically connected to the metalization layer such that the combination thereof, forms an external terminal that can be soldered or otherwise bonded to a circuit board.

It is known to one skilled in the art that an encapsulant is typically formed from a resin and filler. The filler provides a method to control the coefficient of thermal expansion by displacing a portion of the resin in the encapsulant structure. It is hereby noted that though this is the typical art for encapsulation this present invention is not limited to the encapsulant being a resin or a resin filled system. Other encapsulant materials and methods are also applicable to the present invention.

The anode is a conductor, preferably a metal and preferably a valve metal selected from tantalum, aluminum, niobium, titanium, zirconium, hafnium, alloys of these elements, or a conductive oxide thereof such as NbO.

The invention has been described with reference to the preferred embodiments without limit thereto. Additional embodiments and improvements may be realized which are not specifically set forth herein but which are within the scope of the invention as more specifically set forth in the claims appended hereto.

The invention claimed is:

1. A capacitor comprising:
an upper reinforced encapsulant layer;
a lower reinforced encapsulant layer;
a capacitive element between said upper reinforced encapsulant layer and said lower reinforced encapsulant layer wherein said capacitive element comprises:
an anode;
a dielectric on said anode; and
a cathode on said dielectric; and
an internal reinforced encapsulant layer between said upper reinforced encapsulant layer and said lower reinforced encapsulant layer wherein said internal reinforced encapsulant layer further comprises a membrane.

2. The capacitor of claim 1 further comprising a resin encasing at least a portion of said capacitive element.

3. The capacitor of claim 1 wherein said internal reinforced encapsulant layer is planar.

4. The capacitor of claim 1 wherein said internal reinforced encapsulant layer is serpentine.

5. The capacitor of claim 1 wherein said internal reinforced encapsulant layer comprises a cavity with said capacitive element in said cavity.

6. The capacitor of claim 1 further comprising at least one resin layer between said upper reinforced encapsulant layer and said internal reinforced encapsulant layer or between said lower reinforced encapsulant layer and said internal reinforced encapsulant layer.

7. The capacitor of claim 1 further comprising at least one anode lead in electrical contact with said anode.

8. The capacitor of claim 7 wherein said electrical contact is made to an anode node in contact with said anode lead.

9. The capacitor of claim 7 wherein said anode lead is an anode wire.

10. The capacitor of claim 1 further comprising an anode termination on a surface of said capacitor wherein said anode termination is in electrical contact with said anode.

11. The capacitor of claim 10 wherein said electrical contact comprises a metallized hole.

12. The capacitor of claim 11 wherein said metallized hole extends through an anode lead.

13. The capacitor of claim 12 wherein said anode lead is an anode wire.

14. The capacitor of claim 11 wherein said metallized hole is exposed on a surface of said capacitor.

15. The capacitor of claim 1 further comprising at least one of an anode terminal or a cathode terminal.

16. The capacitor of claim 15 wherein at least one of said anode terminal or said cathode terminal are exposed through a surface of said encapsulant.

17. The capacitor of claim 15 wherein at least one of said anode terminal or said cathode terminal are on at least one surface of said encapsulant.

18. The capacitor of claim 17 wherein said cathode termination is in electrical contact with said cathode.

19. The capacitor of claim 1 comprising multiple capacitive elements.

20. The capacitor of claim 1 wherein said cathode comprises at least one of a conductive polymer or a conductive metal oxide.

21. The capacitor of claim 1 wherein said anode comprises a valve metal or conductive oxide of a valve metal.

22. The capacitor of claim 21 wherein said valve metal or valve metal oxide is selected from the group consisting of Al, W, Ta, Nb, Ti, Zr, Hf and conductive oxides thereof.

23. The capacitor of claim 1 further comprising a plated layer in electrical contact with one of said cathode or said anode.

24. The capacitor of claim 23 wherein said plated layer is a circuit trace.

25. The capacitor of claim 23 wherein at least one of said upper reinforced encapsulant layer or said lower reinforced encapsulant layer is between said cathode and said plated layer.

26. The capacitor of claim 1 wherein at least one of said upper reinforced encapsulant layer or said lower reinforced encapsulant layer further comprises an internal metal layer.

27. The capacitor of claim 26 wherein said internal metal layer is electrically connected to an external termination.

28. The capacitor of claim 26 wherein said internal metal layer is electrically isolated from at least one of said anode or said cathode.

29. The capacitor of claim 1 further comprising a surface metal layer on at least one of said upper reinforced encapsulant layer or said lower reinforced encapsulant layer.

30. A capacitor comprising:
an upper reinforced encapsulant layer;
a lower reinforced encapsulant layer;
a capacitive element between said upper reinforced encapsulant layer and said lower reinforced encapsulant layer wherein said capacitive element comprises:
an anode;
a dielectric on said anode; and
a cathode on said dielectric; and
an internal reinforced encapsulant layer between said upper reinforced encapsulant layer and said lower reinforced encapsulant layer wherein said internal reinforced encapsulant layer comprises a cavity with said capacitive element in said cavity further comprising a serpentine internal reinforced encapsulant layer at least partially around said cavity.

31. A capacitor comprising:
an upper reinforced encapsulant layer;
a lower reinforced encapsulant layer;
a capacitive element between said upper reinforced encapsulant layer and said lower reinforced encapsulant layer wherein said capacitive element comprises:
an anode;
a dielectric on said anode; and
a cathode on said dielectric; and
an internal reinforced encapsulant layer between said upper reinforced encapsulant layer and said lower reinforced encapsulant layer further comprising at least one additional internal reinforced encapsulant layer.

32. A capacitor comprising:
an upper reinforced encapsulant layer;
a lower reinforced encapsulant layer;
a capacitive element between said upper reinforced encapsulant layer and said lower reinforced encapsulant layer wherein said capacitive element comprises:
an anode;
a dielectric on said anode; and
a cathode on said dielectric; and
an internal reinforced encapsulant layer between said upper reinforced encapsulant layer and said lower reinforced encapsulant layer further comprising at least one additional upper reinforced encapsulant layer or at least one additional lower reinforced encapsulant layer.

33. An electronic component comprising:
an upper reinforced encapsulant layer;
a lower reinforced encapsulant layer;
an electronic element between said upper reinforced encapsulant layer and said lower reinforced encapsulant layer; and
an internal reinforced encapsulant layer between said upper reinforced encapsulant layer and said lower reinforced encapsulant layer wherein said internal reinforced encapsulant layer further comprises a membrane.

34. The electronic component of claim 33 wherein said electronic element is selected from the group consisting of capacitive element, resistive element, varistor element, inductive element, diode, fuse, overvoltage discharge element, sensor, switch, electrostatic discharge suppressor, semiconductor or integrated circuit.

35. The electronic component of claim 33 further comprising a resin encasing at least a portion of said electronic element.

36. The electronic component of claim 33 wherein said internal reinforced encapsulant layer is planar.

37. The electronic component of claim 33 wherein said internal reinforced encapsulant layer is serpentine.

38. The electronic component of claim 33 wherein said internal reinforced encapsulant layer comprises a cavity with said electronic element in said cavity.

39. The electronic component of claim 33 further comprising at least one additional internal reinforced encapsulant layer.

40. The electronic component of claim 33 further comprising at least one additional upper reinforced encapsulant layer or at least one additional lower reinforced encapsulant layer.

41. The electronic component of claim 33 further comprising at least one resin layer between said upper reinforced encapsulant layer and said internal reinforced encapsulant layer or between said lower reinforced encapsulant layer and said internal reinforced encapsulant layer.

42. The electronic component of claim 33 wherein said electronic element is a capacitive element wherein said capacitive element comprises:
an anode;
a dielectric on said anode; and
a cathode on said dielectric.

43. The electronic component of claim 42 further comprising at least one anode lead in electrical contact with said anode.

44. The electronic component of claim 43 wherein said electrical contact is made to an anode node in contact with said anode lead.

45. The electronic component of claim 43 wherein said anode lead is an anode wire.

46. The electronic component of claim 42 further comprising a termination on a surface of said electronic component wherein said termination is in electrical contact with electronic element.

47. The electronic component of claim 46 wherein said electrical contact comprises a metallized hole.

48. The electronic component of claim 47 wherein said metallized hole is exposed on a surface of said electronic component.

49. The electronic component of claim 46 wherein said termination is exposed through a surface of said encapsulant.

50. The electronic component of claim 49 wherein said termination is on at least one surface of said encapsulant.

51. The electronic component of claim 33 wherein at least one of said upper reinforced encapsulant layer or said lower reinforced encapsulant layer further comprises an internal metal layer.

52. The electronic component of claim 51 wherein said internal metal layer is electrically connected to an external termination.

53. The electronic component of claim 33 further comprising a surface metal layer on at least one of said upper reinforced encapsulant layer or said lower reinforced encapsulant layer.

54. An electronic component comprising:
an upper reinforced encapsulant layer;
a lower reinforced encapsulant layer;
an electronic element between said upper reinforced encapsulant layer and said lower reinforced encapsulant layer; and
an internal reinforced encapsulant layer between said upper reinforced encapsulant layer and said lower reinforced encapsulant layer wherein said internal reinforced encapsulant layer comprises a cavity with said electronic element in said cavity further comprising a serpentine internal reinforced encapsulant layer at least partially around said cavity.

55. A capacitor comprising:
an upper reinforced encapsulant layer;
a lower reinforced encapsulant layer;
a capacitive element between said upper reinforced encapsulant layer and said lower reinforced encapsulant layer wherein said capacitive element comprises:
an anode;
a dielectric on said anode; and
a cathode on said dielectric; and
a serpentine reinforced encapsulant layer between said upper reinforced encapsulant layer and said lower reinforced encapsulant layer wherein said serpentine reinforced encapsulant layer is at least partially around said capacitive element.

56. An electronic component comprising the capacitor of claim 55.

* * * * *